United States Patent [19]

Cachia

[11] 4,190,266
[45] Feb. 26, 1980

[54] PASSIVE SEAT BELT SYSTEM

[75] Inventor: Joseph M. Cachia, Knoxville, Tenn.

[73] Assignee: Allied Chemical Corporation, Morris Township, Morris County, N.J.

[21] Appl. No.: 839,158

[22] Filed: Sep. 28, 1977

[51] Int. Cl.² ............................................. B60R 21/02
[52] U.S. Cl. .................................................... 280/802
[58] Field of Search ............................ 280/744–747; 180/32 C; 297/388, 389

[56] References Cited

U.S. PATENT DOCUMENTS

| | | | |
|---|---|---|---|
| 3,850,446 | 11/1974 | Hogensen | 280/745 |
| 3,895,822 | 7/1975 | Seiffert et al. | 280/745 |
| 3,897,963 | 8/1975 | Seiffert et al. | 280/745 |
| 3,902,736 | 9/1975 | Bluggel et al. | 280/745 |
| 4,072,323 | 2/1978 | Shimokawa et al. | 280/745 |

FOREIGN PATENT DOCUMENTS 2298456  1/1975  France ..................... 280/745

Primary Examiner—Robert B. Reeves
Assistant Examiner—Gene A. Church
Attorney, Agent, or Firm—Roger H. Criss

[57] ABSTRACT

In a vehicle passive seat belt restraint system including a seat belt having one end attached at a point of attachment to a door of the vehicle and its opposite end attached in the interior of the vehicle such that when the door is closed, the belt is automatically moved to a first position at which it restrains an occupant when seated in his seat and when the door is opened, the belt is moved to a second position located forward of the vehicle with respect to the first position, to permit free ingress to and egress from the vehicle, the door having a pivot point upon which the door pivots during opening and closing, the improvement for moving the belt to its second position upon only partial opening of the door, the improvement comprising:

rod member having one end pivotally connected to the frame of the vehicle at a point located adjacent to and above the height of the door and having an opposite end communicating with the seat belt, the distance between the one end and the opposite end of the rod member being less than the distance between the pivot point of the door and the point of attachment of the seat belt to the door, whereby partial opening of the door causes the rod member to move the belt to its second position.

7 Claims, 2 Drawing Figures

PASSIVE SEAT BELT SYSTEM

BACKGROUND OF THE INVENTION

1. Field of the Invention

This invention relates to passive seat belt systems for providing automatic crash protection to vehicle occupants.

2. Description of the Prior Art

Passive seat belt systems have been suggested in which the seat belt is automatically positioned about a vehicle occupant before the vehicle is operated, e.g., after the door is closed. Exemplary of such systems are those described in U.S. Pat. Nos. 3,895,822 and 3,897,963 to Seiffert et al. The system disclosed in such patents includes a single diagonal seat belt which is fixed at one end to a portion of the door at a location above the height of and rearward of the occupant's shoulder and has its opposite end attached to a retractor mounted, for example, beneath or to the side of the seat. Upon closing of the door, the seat belt is moved to a position to permit ingress and egress of the occupant. When the door is closed, the belt is moved to a position wherein the occupant is restrained in his seat, with any slack in the belt being taken up by the retractor. The retractor itself typically is of the emergency locking type which permits the belt to be extended and retracted so that the occupant can move freely about in his seat during normal driving conditions, but which locks against further belt extension upon deceleration of the vehicle and/or acceleration of the retractor shaft above a predetermined level.

One problem associated with such passive seat belt system is that complete opening of the door is necessary in order to effect full seat belt travel to the position at which ingress and egress are not restricted. This is particularly troublesome in situations where the door cannot be completely opened such as in "tight" parking spaces, and it may be very difficult for the occupant to egress from the vehicle.

It would be desirable if a simple but effective means were provided to completely move the belt to a forward, out-of-the-way position upon only partial opening of the door.

SUMMARY OF THE INVENTION

In accordance with this invention, there is provided in a vehicle passive seat belt restraint system including a seat belt having one end attached at a point of attachment to a door of the vehicle and the opposite end attached in the interior of the vehicle such that when the door is closed, the belt is automatically moved to a first position at which it restrains an occupant when seated in his seat and when the door is opened, the belt is moved to a second position located forward of the vehicle with respect to the first position to permit free ingress to and egress from the vehicle, the door having a pivot point upon which the door pivots during opening and closing, the improvement for moving the belt to its second position upon only partial opening of the door, the improvement comprising:

rod means having one end pivotally connected to the frame of the vehicle at a point located adjacent to and above the height of the door and having an opposite end communicating with the seat belt, the distance between the one end and opposite end of the rod means being less than a distance between the pivot point of the door and the point of attachment of the seat belt to the door, whereby partial opening of the door causes the rod means to move the belt to its second position.

Since the pivot radius of the rod means is smaller than the pivot radius of the vehicle door, the seat belt webbing is moved to a forward, out-of-the-way position upon only partial door opening. Moreover, in one embodiment to this invention, the rod means, which may be in the form of an arm, is biased towards its second position by means of a spring.

DESCRIPTION OF THE PREFERRED EMBODIMENTS

Figure 1:
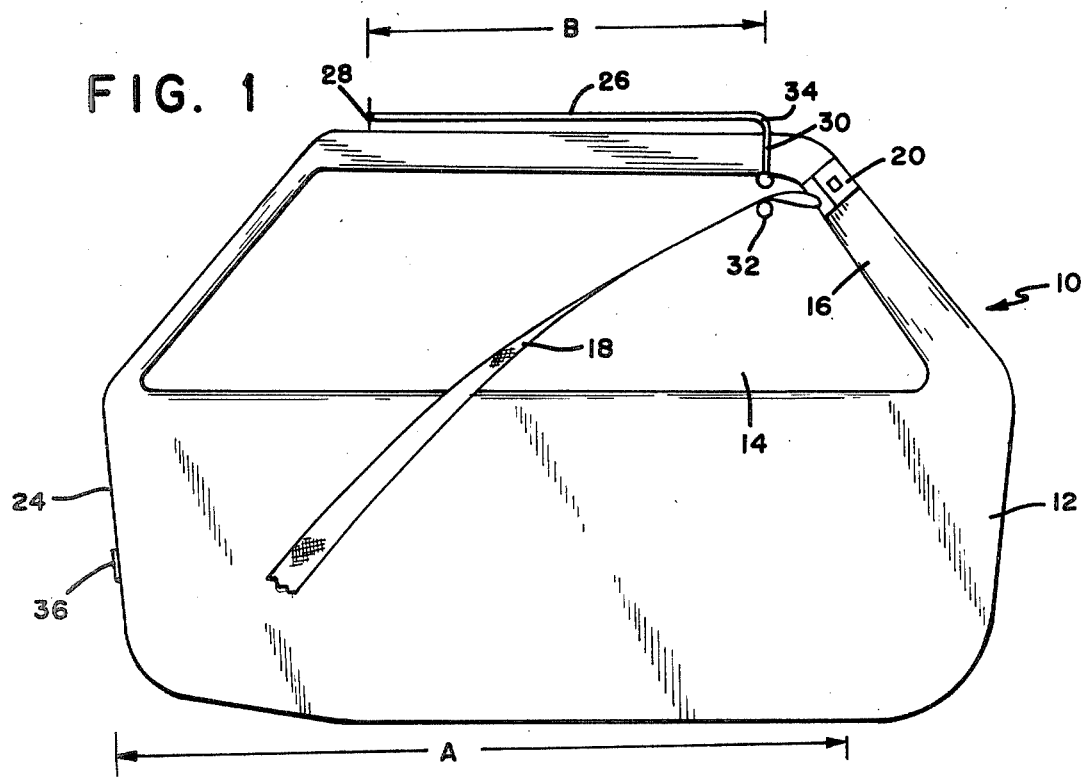
FIG. 1 is a side view of the passive seat belt system of this invention with a door in its closed position.

With respect to the drawings, the passive seat belt system of this invention, generally indicated at 10, is provided in a vehicle which has a door 12, window 14 and window frame 16. To the window frame 16 (or other door frame area) is attached one end of a seat belt 18 which is formed of conventional seat belt webbing. Seat belt 18 may be directly attached to door 12 or may be connected to an emergency release buckle 20 which is in turn connected directly (or indirectly) to door 12. An emergency release buckle of this type is disclosed, for example, in U.S. Pat. No. 3,895,822. The end of seat belt 18 opposite from door 12 is connected to a conventional seat belt retractor (not shown) having a rewind spring to take up slack in the belt and a locking means to prevent extension of the belt, as is generally known. Preferably, the retractor is an emergency locking type retractor which locks upon deceleration of the vehicle and/or acceleration of the retractor shaft. The retractor may be mounted in any suitable location, such as adjacent the opposite side of the seat associated with the door; e.g., the retractor may be mounted to the seat, the seat adjusting rail, floor or other suitable vehicle frame area.

Mounted on the interior of roof 22 of the vehicle at a position adjacent to the forward edge 24 of door 12 is rod means 26. Rod means 26 is preferable in the form of a rigid arm, such as formed of metal, which is pivoted in a vertical plane at one end 28 to the vehicle roof 22 or side of the car above the top of the door. Arm 26 is located at a position, with door 12 closed, between the top of door 12 and the adjacent portion of the vehicle roof located thereabove. The opposite end 30 of arm 26, which extends towards the vehicle interior such as by being bent at 34 is connected to a loop means 32 through which seat belt 18 freely passes. Loop means 32 preferably is in the form of an oval shaped loop or ring and is formed of metal, plastic or other suitable material. The distance A between the pivot point of arm 26 and loop 32 is less than the distance B between the pivot point 36 of door 12 and the mounting point of seat belt 18 on door 12.

Figure 2:
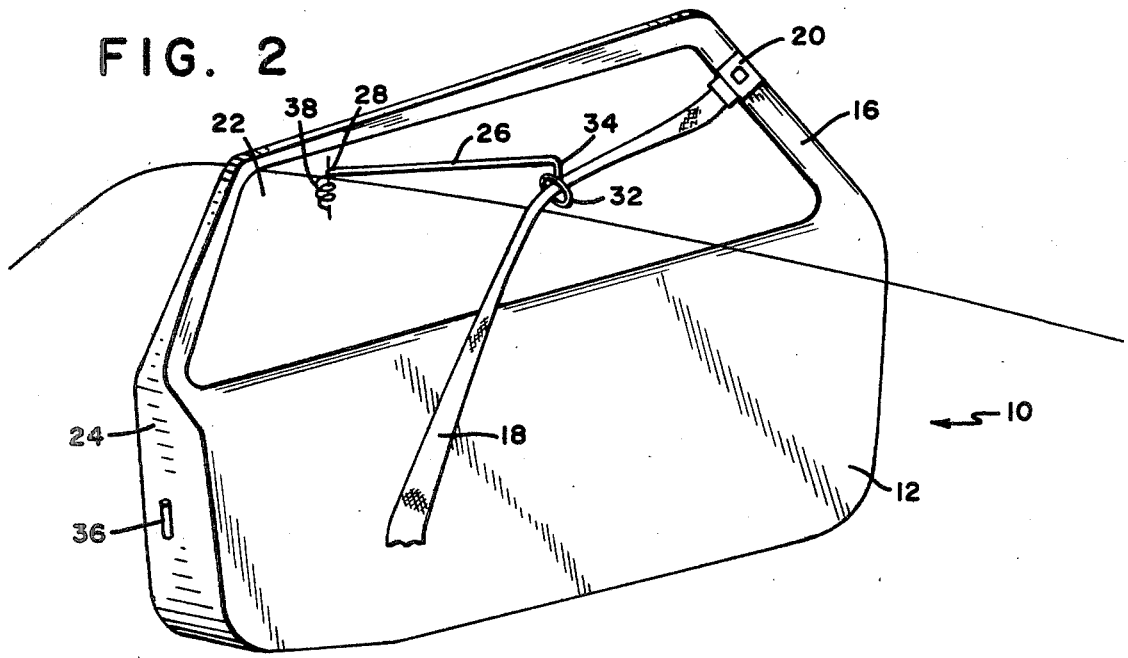
FIG. 2 is a side view of the passive seat belt system of this invention with a door in its opened position.

In the closed door position (FIG. 1), arm 26 is aligned in a vertical plane with door 12 at a position above door 12, with loop 32 being positioned adjacent to the mounting point of seat belt 18 on door 12, e.g., adjacent to buckle 20. The seat belt 18 is in its first position at which it restrains an occupant in his seat. When door 12 is opened (FIG. 2) seat belt 18 is extended from the retractor and the webbing is pulled upwards and forward with respect to its first position as it moves through loop 32. Loop 32 pivots outwards away from the interior of the car. Since the distance A is less than the distance B, the effective radius of the seat belt 18 on loop 32 is less than the effective radius of seat belt 18 on door 12 and hence seat belt 18 is moved to its maximum forward and upward position (second position) before door 12 is opened to its greatest extent. This permits easy exiting from the vehicle when the door is only partially opened.

When door 12 is closed, seat belt 18 is wound up on the retractor and as the door 12 closes, seat belt 18 moves freely through loop 32 to its first, occupant restraining position. In one embodiment, spring means 38 is provided to bias arm 32 in a horizontal plane to its second position, so that when door 12 is opened, arm 32 is pivoted to its second position.

Accordingly, this invention permits complete forward motion of the passive seat belts when the adjacent door is only partially opened. This is accomplished without any modification to the seat belts per se and by means of an inexpensive and simple lever mechanism.

It has previously been proposed in U.S. Pat. No. 3,850,446 to provide a swingable arm which is attached to the belt and which moves the belt into and out of position. However, the device therein disclosed requires direct attachment to the belt end and integral formation of a buckle at one end of the arm. Besides requiring these extensive modifications to the belt, a recess on the door sill is required to house the buckle when the door is closed. Furthermore, the lever is mounted on the door and thereby prone to inadvertently contact an occupant when entering or leaving the vehicle.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. In a vehicle passive seat belt restraint system including a seat belt having one end attached at a point of attachment to a door of said vehicle and the opposite end attached in the interior of said vehicle such that when the said door is closed, said belt is automatically moved to a first position at which it restrains an occupant when seated in his seat and when said door is opened, said belt is moved to a second position located forward of said vehicle with respect to said first position, to permit free ingress to and egress from said vehicle, said door having a pivot point upon which said door pivots during opening and closing, the improvement for moving said belt to said second position upon only partial opening of said door, said improvement comprising:

rod means having one end pivotally connected to the frame of the vehicle at a point located adjacent to and above the height of said door and having an opposite end communicating with said seat belt, the distance between said one end and said opposite end of said rod means being less than the distance between said pivot point of said door and said point of attachment of said seat belt to said door, whereby partial opening of said door causes said rod means to move said belt to its second position.

2. The passive seat belt restraint system of claim 1 wherein said rod means is biased in a horizontal plane in the direction of said door.

3. The vehicle passive restraint system of claim 1 wherein said opposite end of said rod means is constructed so as to permit free passage of said seat belt therethrough.

4. The vehicle passive restraint system of claim 3 wherein said opposite end of said rod means is in the form of a loop.

5. The vehicle passive seat belt restraint system of claim 1 wherein an emergency release buckle is associated with said seat belt.

6. The vehicle passive seat belt restraint system of claim 5 wherein said emergency release buckle is attached to said one end of said seat belt and is also attached to said door.

7. The vehicle passive seat belt restraint system of claim 1 wherein said opposite end of said seat belt is connected to a retractor mounted in said vehicle on the opposite side of a seat of said vehicle from the side of said seat adjacent to said door.

* * * * *